United States Patent [19]

Cao

[11] Patent Number: 5,280,576
[45] Date of Patent: Jan. 18, 1994

[54] METHOD OF ADJUSTING THE WEIGHT OF A CHARACTER OF AN OUTLINE FONT

[75] Inventor: Chong Q. Cao, San Gabriel, Calif.
[73] Assignee: Xerox Corporation, Stamford, Conn.
[21] Appl. No.: 813,166
[22] Filed: Dec. 24, 1991
[51] Int. Cl.⁵ .............................................. G06F 15/70
[52] U.S. Cl. ................................... 395/150; 395/151; 345/128; 345/144
[58] Field of Search ............... 395/150, 151, 142, 143; 340/730, 731, 735, 748, 751

[56] References Cited

U.S. PATENT DOCUMENTS

| | | | |
|---|---|---|---|
| 4,620,287 | 10/1986 | Yam | 364/518 |
| 5,115,479 | 5/1992 | Murayama | 382/56 |
| 5,155,805 | 10/1992 | Kaasila | 395/151 |

Primary Examiner—Gary V. Harkcom
Assistant Examiner—Joseph H. Feild
Attorney, Agent, or Firm—Robert Cunha

[57] ABSTRACT

A method for adjusting the weight of a character of an outline font to produce an adjusted character, the character and adjusted character being described by collections of control points that guide the drawing of line or curve segments, with each line or curve segment being described by two end control points and each curve segment also being described by at least one middle control point. According to the method, first and second lines are determined for each segment of the character. The first line is the line defined by the two end control points of the segment, and the second line is the line parallel to the first line and offset from the first line a predetermined distance in a predetermined direction. Next, first intersects are determined for each segment of the character. The first intersects are the intersects between the associated second line and the second lines of adjoining character segments. The first intersects are set as the end control points of the associated segment of the adjusted character. Then third and fourth lines and a second intersect are determined for each curve segment of the character. The third line is the line defined by one end control point of the character curve segment and the associated end control point of the associated adjusted character curve segment. The fourth line is the line defined by the other end control point of the character curve segment and the associated end control point of the associated adjusted character curve segment. The second intersect is the intersect between the associated third and fourth lines. Fifth and sixth lines are determined for each middle control point of each curve segment of the character. The fifth line is the line defined by the middle control point and the second intersect. The sixth line is the line that passes through the adjoining end control point of the associated curve segment of the adjusted character and that is parallel to a line defined by the character middle control point and the adjoining character end control point. Finally, an associated middle control point of the associated adjusted character is determined for each middle control point. The associated middle control point is the intersect between the associated fifth and sixth lines.

4 Claims, 7 Drawing Sheets

METHOD OF ADJUSTING THE WEIGHT OF A CHARACTER OF AN OUTLINE FONT

BACKGROUND AND INFORMATION DISCLOSURE STATEMENT

This invention relates to outline fonts, and more particularly to a method for adjusting the weight of a character of an outline font.

Frequently a font designer desires to modify a particular font (i.e., a typeface at a particular size in a particular style) so that the characters of the font exhibit the same general style, but have a different weight. That is, it is desired to make the characters of the font appear lighter or bolder. In the past, modifying the weight of characters required adjusting the bit map representation of each character by hand, a difficult, time-consuming task requiring great skill. At present, some fonts allow limited changes to weight through the use of a complex system of hints.

SUMMARY OF THE INVENTION

A method is provided that adjusts the weight of a character of an outline font to produce an adjusted character, the character and adjusted character being described by collections of control points that guide the drawing of line or curve segments, with each line or curve segment being described by two end control points and each curve segment also being described by at least one middle control point. According to the method, first and second lines are determined for each segment of the character. The first line is the line defined by the two end control points of the segment, and the second line is the line parallel to the first line and offset from the first line a predetermined distance in a predetermined direction. Next, first intersects are determined for each segment of the character. The first intersects are the intersects between the associated second line and the second lines of adjoining character segments. The first intersects are set as the end control points of the associated segment of the adjusted character. Then third and fourth lines and a second intersect are determined for each curve segment of the character. The third line is the line defined by one end control point of the character curve segment and the associated end control point of the associated adjusted character curve segment. The fourth line is the line defined by the other end control point of the character curve segment and the associated end control point of the associated adjusted character curve segment. The second intersect is the intersect between the associated third and fourth lines. Fifth and sixth lines are determined for each middle control point of each curve segment of the character. The fifth line is the line defined by the middle control point and the second intersect. The sixth line is the line that passes through the adjoining end control point of the associated curve segment of the adjusted character and that is parallel to a line defined by the character middle control point and the adjoining character end control point. Finally, an associated middle control point of the associated adjusted character is determined for each middle control point. The associated middle control point is the intersect between the associated fifth and sixth lines.

Other aspects of the invention will become apparent from the following description with reference to the drawings, wherein:

DETAILED DESCRIPTION OF THE PREFERRED EMBODIMENT

The method of the present invention involves two separate procedures. In brief, the first procedure either thickens or thins the portions of a character, depending on whether the weight of the character is to be made bolder or lighter, respectively. This first procedure, however, typically changes features of the character, such as the width and the type (i.e., height) of the character that should remain unchanged. The second procedure corrects for the undesired changes induced by the first procedure.

Figure 1:
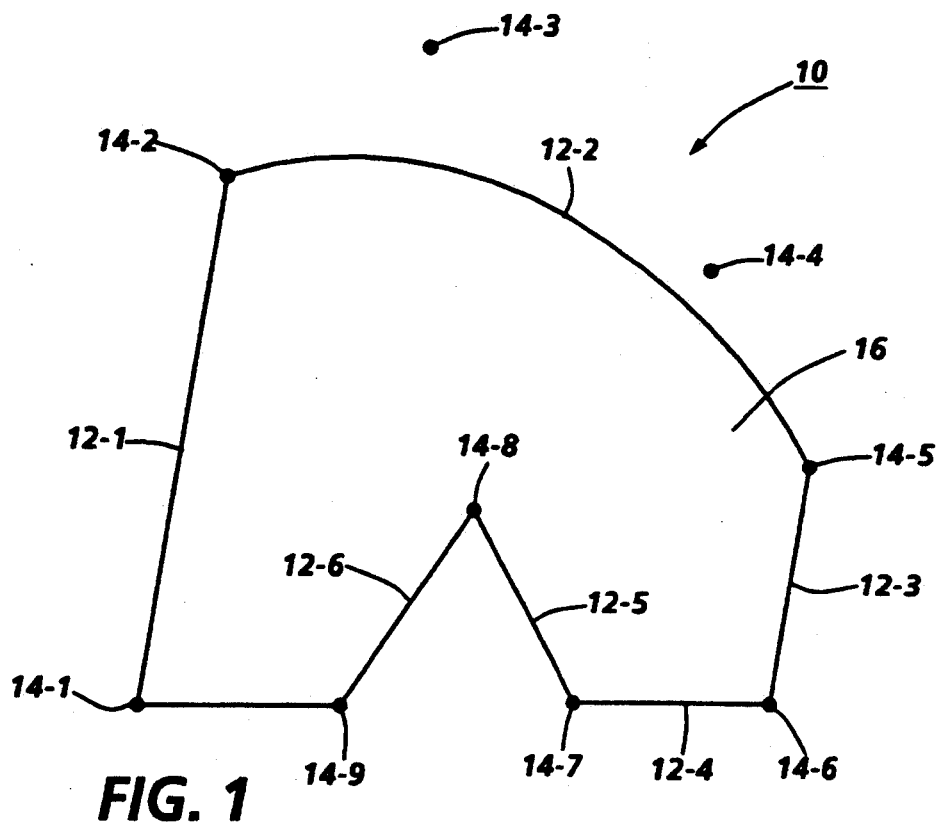
FIG. 1 is a schematic representation of a character, the character being described by an FIS file, including the control points of the character.

Referring now to FIGS. 1 through 6, the first procedure of the method of the present invention can be better understood with reference to an example. In FIG. 1 there is shown a schematic representation of a character 10 of an outline font. Character 10 is a simple, arbitrary shape, chosen to demonstrate the method of the invention, not to duplicate a particular letter of any alphabet. Character 10 consists of six segments 12 forming a closed shape. Character 10 can be described by any file format supporting outline fonts. In particular, character 10 is described by a Font Interchange Standard (FIS) file. FIS is a character code or format supported by Interpress, which is a document and page description language. FIS is described in detail in a document entitled, "Font Interchange Standard," publication no. XNSS-239007, available from Xerox Corporation. Details on how Interpress enables a printer (not shown) to print a character, such as character 10, represented by an FIS file can be found in publications entitled, "Interpress Electronic Printing Standard," publication No. XNSS 048601, available from Xerox Corporation and "Interpress: The Source Book," published by Brady.

In brief, an FIS file describes a character with respect to a two dimensional Cartesian coordinate system. Each FIS file includes two major sections, character masks and character metrics. The character metrics section describes the position of a character with respect to other characters in a line of characters (i.e., escapement), and respect to the x-axis (baseline) and y-axis (i.e., ascent, descent, left and right extent). The character masks section describes the shape of the character by means of sets of control points that define line or curve segments. Curve segments are represented by conic, Bezier, or B-spline curves, of cubic or higher order. In particular, the curve segments of character 10 are represented in the FIS file character masks file by third order Bezier curves, which require four control points per curve segment. Each control point is specified as a Cartesian (i.e.,(x,y)) coordinate.

The six segments 12 of character 10 are, in series, line segment 12-1, curve segment 12-2, and line segments 12-3, 12-4, 12-5, and 12-6. Like any line segment, line segment 12-1 is defined by two control points, 14-1 and 14-2, positioned at opposite ends of line segment 12-1. Like any cubic Bezier curve segment, curve segment 12-2 is defined by four control points 14, a control point 14-2 positioned at one end of curve 12-2, a control point 14-5 positioned at the opposite end of curve 12-2, and two middle control points 14-3 and 14-4 positioned between end control points 14-2 and 14-5. Line segment 12-3 is defined by end control points 14-5 and 14-6, line segment 12-4 is defined by end control points 14-6 and 14-7, line segment 12-5 is defined by end control points 14-7 and 14-8, and line segment 12-6 is defined by end control points 14-8 and 14-1. The region 16 enclosed by segments 12 is shown as blank for convenience, but character 10 would more likely be printed with region 16 filled in (e.g., solid black).

Figure 2:
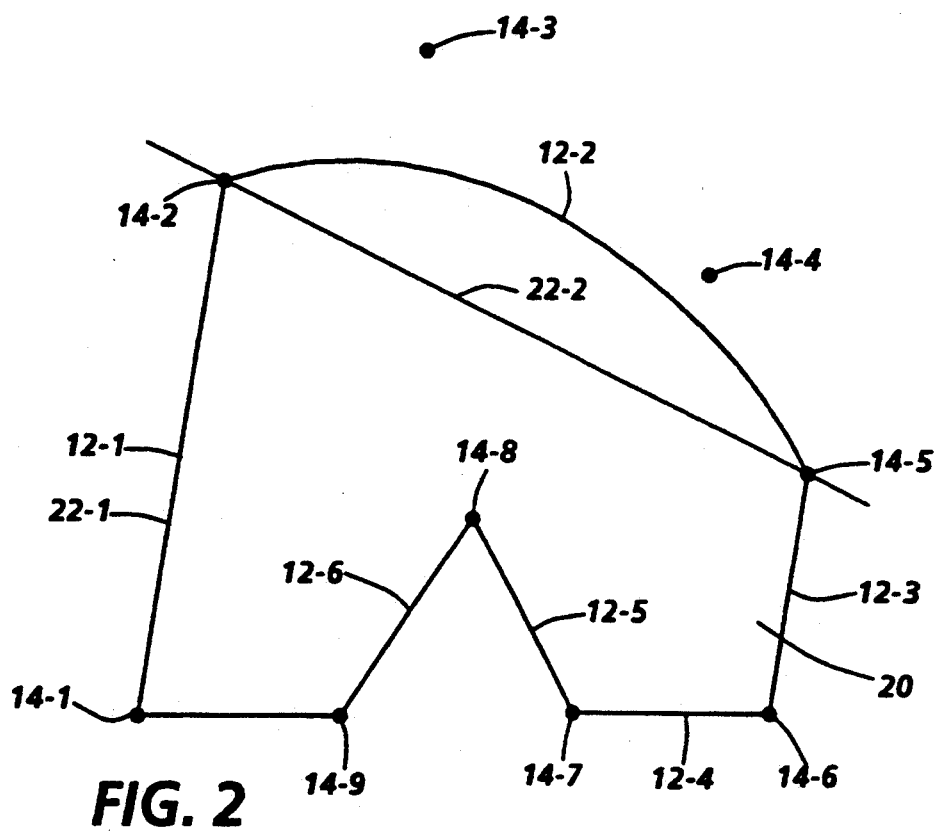
FIGS. 2 through 6 are schematic representations of steps in adjusting the character of FIG. 1 to lighten the character.
Figure 6:
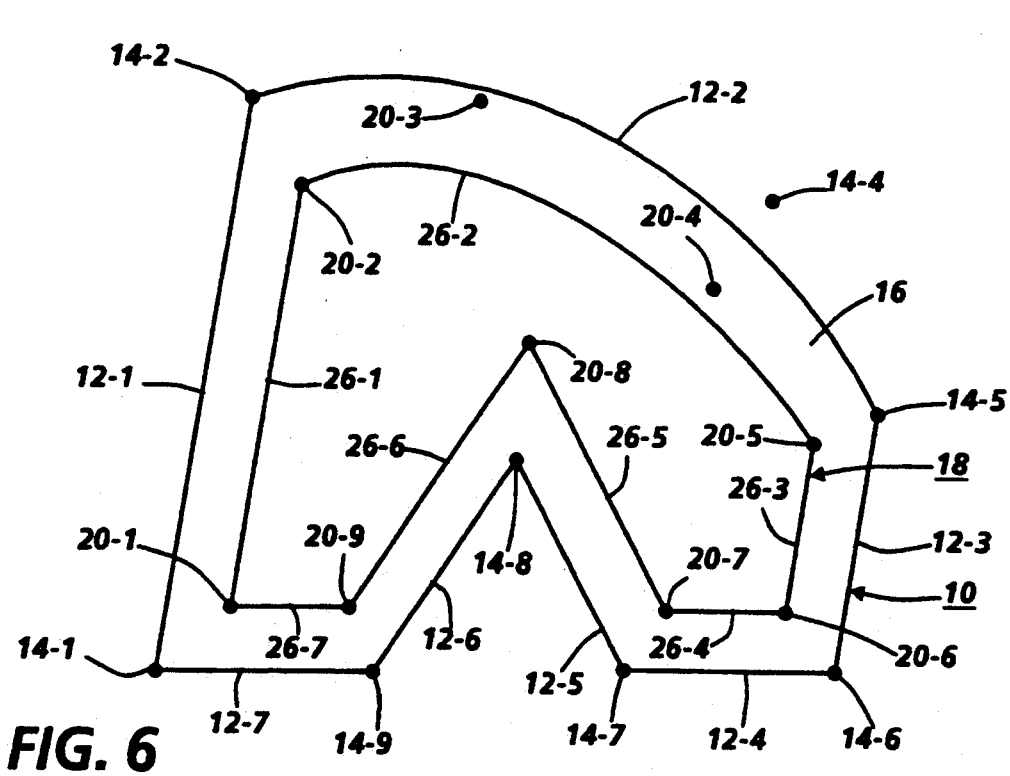

Referring now to FIGS. 1, 2 and 6, the first procedure adjusts the weight of character 10 to form a new character 18 by adjusting control points 14 of the FIS file character masks of character 10 to create the new control points 20 of the character masks of new character 18. The method then adjusts the character metrics of character 10 to reflect the changes to character 10 in the character metrics of new character 18.

Figure 3:
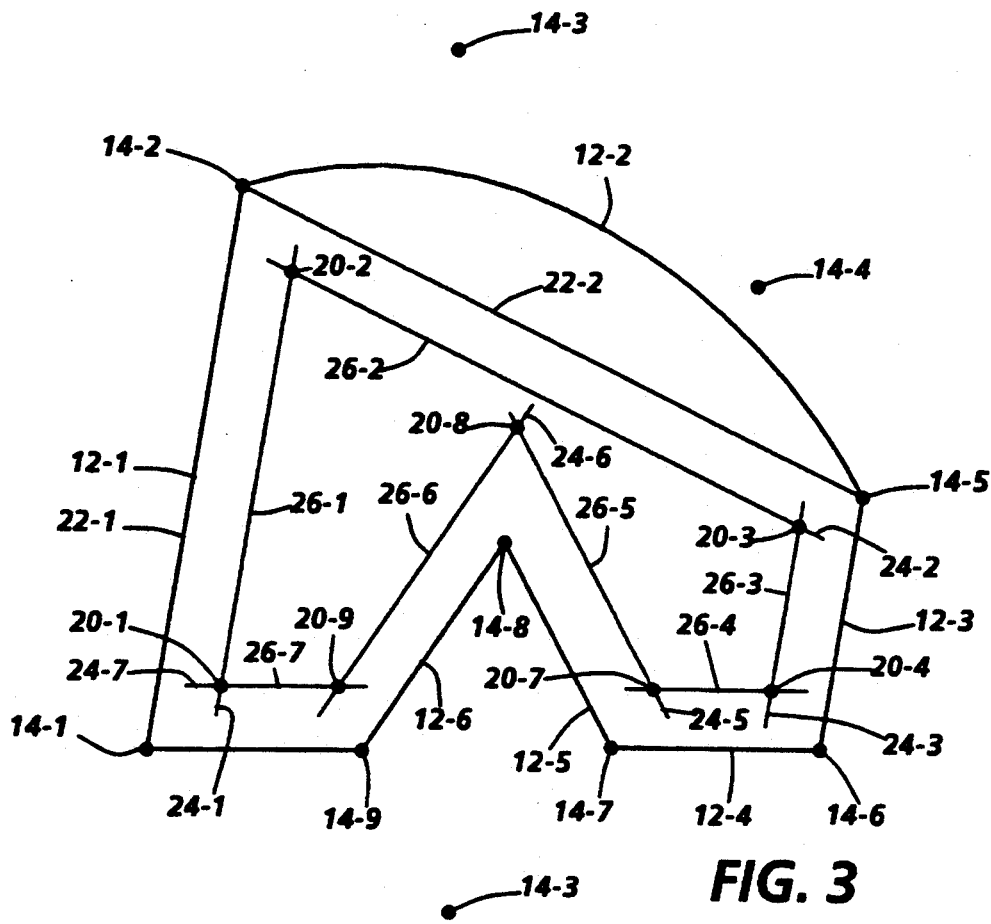

In operating on the character masks, the method first determines an adjustment to end control points (i.e., 14-1, 14-2, 14-5 and 14-6), then determines an adjustment to middle control points (i.e., 14-3 and 14-4). To adjust the end control points, the first step is to determine end control point lines 22 for each segment 12, as shown in FIG. 3. An end control point line (ECPL) 22 is the line defined by (i.e., through) the two control points 14 at the end of a segment 12. Alternatively, for line segments such as 12-1, the corresponding ECPL 22-1 is colinear with the line segment 12-1, and the line segment 12-1 itself can serve the function of the ECPL 22-1. (For clarity, in FIG. 2 the only line segment ECPL labeled is ECPL 22-1.) However, for curve segments such as curve segment 12-2, and ECPL 22-2 is created through the corresponding end control points 14-2 and 14-5. Next, for each segment 12 a new ECPL 24 is created that is parallel to the associated ECPL 22, but offset from the ECPL 22 a set distance in a direction, normal to the ECPL 22, that depends on whether the character 10 is to be lightened or made bold. For lightening, the direction is chosen that thins the portion of the character 10 to which the segment 12 is a boundary, and for making bolder, the opposite direction is chosen. The intersections between an ECPL 24 and its two adjoining ECPLs 24 define the new control points 20 on the ends of the segments 26 of the new character 18. With the new control points 20 defined for the ends, the first procedure is complete for line segments, such as line segment 26-1.

Figure 4:
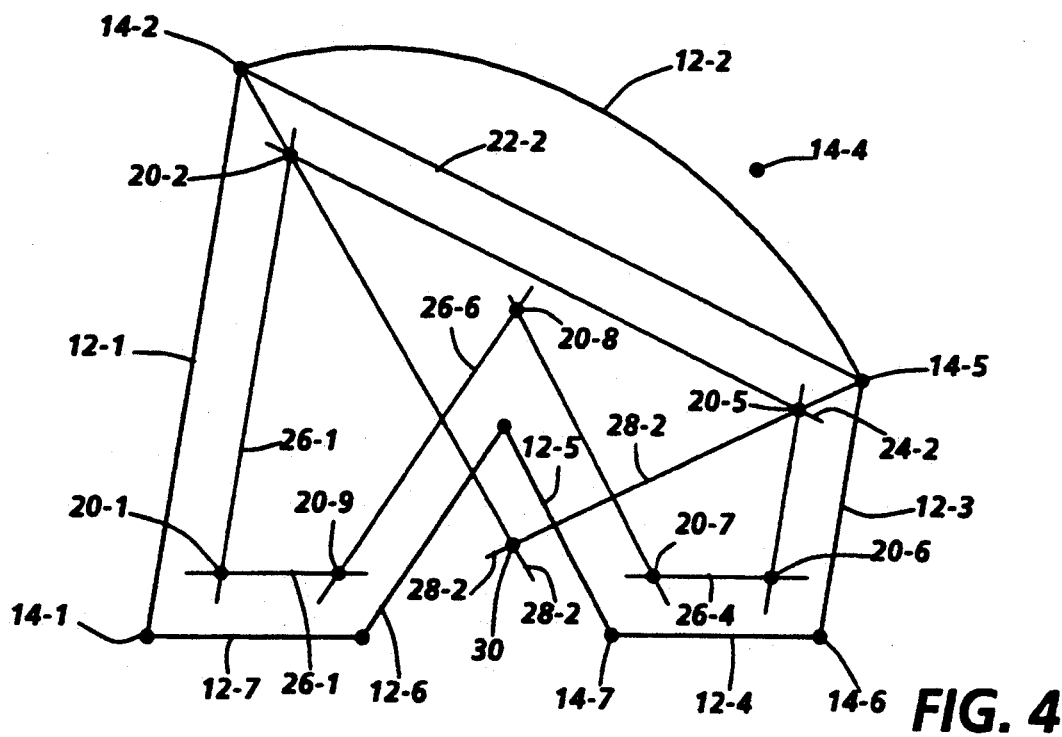
Figure 5:
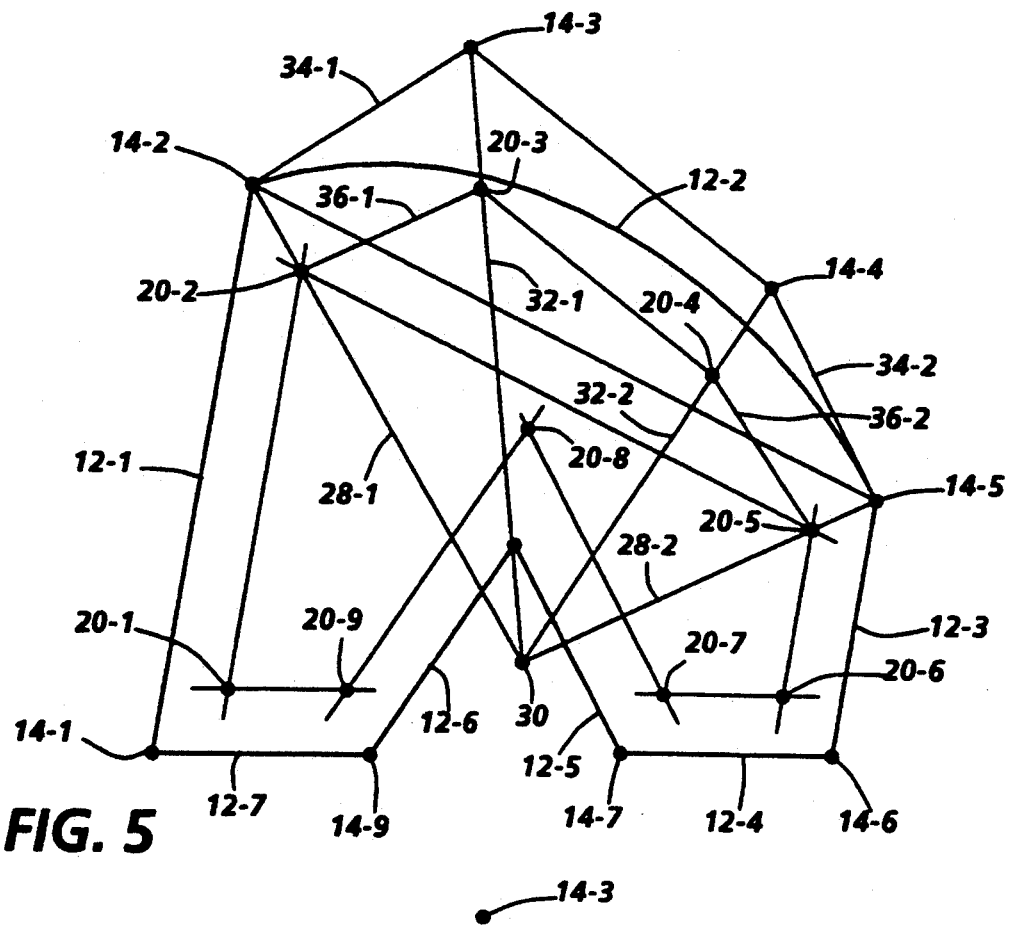

Adjusting the middle control points is a more involve process than adjusting end control points. Referring now to FIG. 4, for each curve segment, such as curve segment 12-2, a line 28-1 is defined by one end control point, control point 14-2, of the old segment, segment 12-2 and the associated end control point, control point 20-2, of the new segment, segment 26-2. Similarly, a line 28-2 is defined by control point 14-5 and control point 20-5. The intersect 30 of lines 28-1 and 28-2 is then determined. Intersect 30 is then used with the middle control points 14 to define lines 32 along which will lie the new middle control points 20, as shown in FIG. 5: Line 32-1 is defined by intersect 30 and control point 14-3, and line 32-2 is defined by intersect 30 and control point 14-4. To position middle control points 20-3 and 20-4 along respective lines 32-1 and 32-2, there first must be defined lines 34. Lines 34 are lines defined by a middle control point 14 and its adjoining end control point 14. In particular, line 34-1 is defined by end control point 14-2 and middle control point 14-3, and line 34-2 is defined by end control point 14-5 and middle control point 14-4. Next there is defined lines 36. Lines 36 are lines parallel to an associated line 34, that also pass through an end control point 20. In particular, line 36-1 is parallel to line 34-1, and passes through end control point 20-2. Similarly, line 36-2 is parallel to line 34-2, and passes through end control point 20-5. The middle control points 20 are then the intersects between the associated line 36 and the associated line 32. In particular, middle control point 20-3 is the intersect between line 36-1 and line 32-1. Similarly, middle control point 20-4 is the intersect between line 36-2 and line 32-2.

There are two approaches to creating a character metrics for new character 18. One approach is to calculate new parameters (e.g., ascent, descent, left extent and right extent) for each character of the font. The other approach is to calculate the changes for a single, representative character of the font, then apply those changes to every character of the font. Preferably, the second approach is used, since it requires much less calculation, yet yields acceptable results. For the English alphabet, the representative character typically used is the capital letter H. Capital H is chosen because it is the character with the greatest ascent, and it rests on the baseline. For the letter H, the adjustments to the character metrics are simple and straightforward: For a lightened character, the ascent, descent, left extent and right extent are decremented by the amount of the predetermined distance. The escapement parameter is not changed, since this parameter should remain the same between the original and weight-adjusted font. For making the letter H bolder, the parameters (except the escapement) are simply incremented by the predetermined distance. The resulting character, character 18, is shown in FIG. 6.

Referring now to FIG. 6, the new character 18 can be seen to be lighter in weight than the old character 10, while retaining the style of character 10. However, character 18 is also different than character 10 in other, undesirable aspects, particularly with respect to character width, height and vertical position. These side effects of the first procedure are better seen with a more complex character than character 10.

Figure 7:
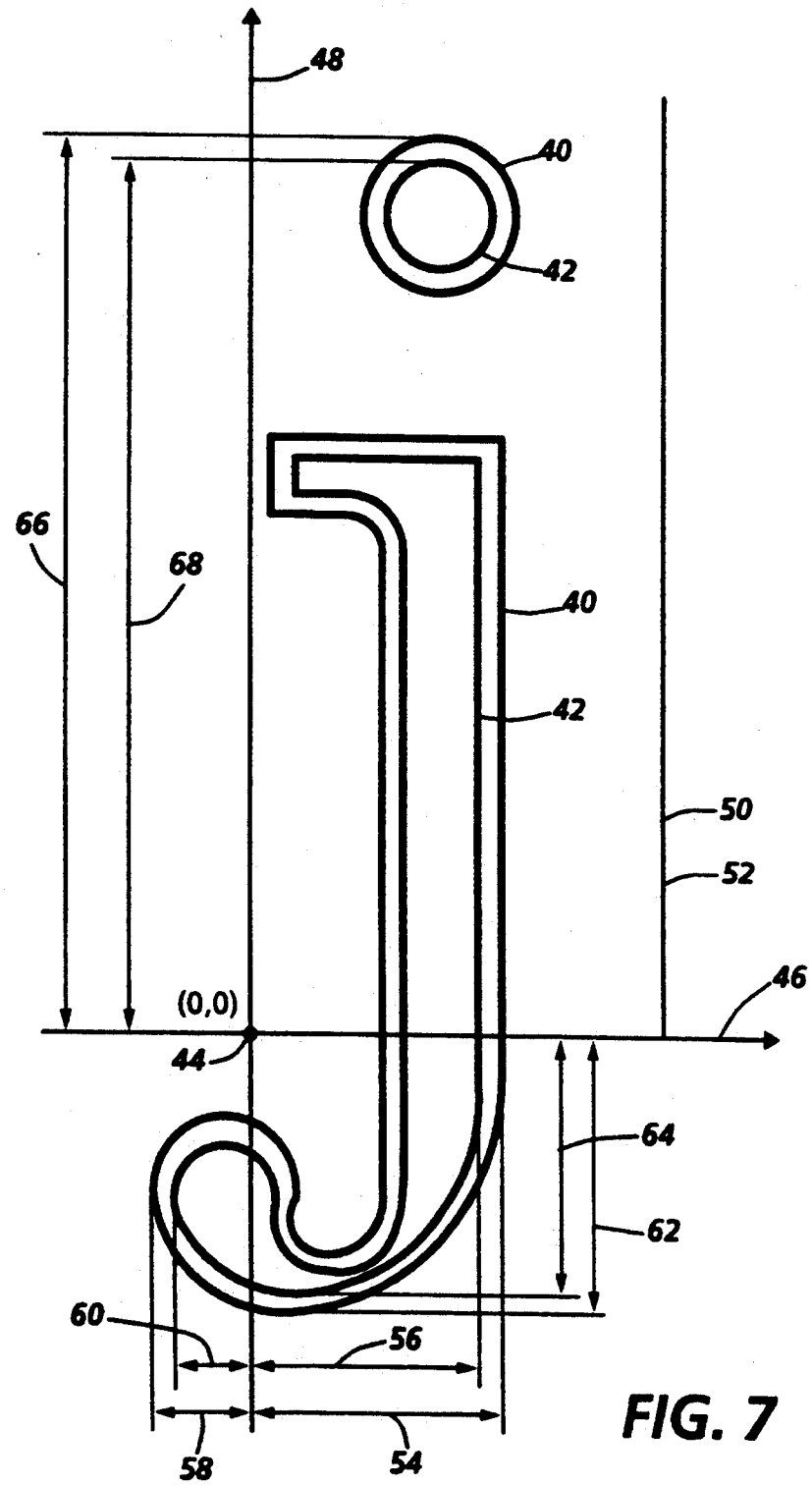
FIGS. 7 through 10 are schematic representations of a character, the small letter j, each figure overlaying the modified and unmodified versions of the letter, the series of figures demonstrating successive steps of the method of the present invention.

Referring now to FIG. 7, there is shown a character 40, a small letter j in Times Roman font. Character 40 has been lightened through use of the first procedure, resulting in character 42. Character 42 is shown overlying character 40 for ease of comparison. Characters 40 and 42 are described relative to an origin 44 of a Cartesian coordinate system having a horizontal x-axis 46 and a vertical y-axis 48, both of which pass through an origin 44. For convenience, in the FIS format the origin 46 is chosen such that the x-axis 46 is aligned with the baseline of the font. The actual distance characters 40 and 42 extend in the positive x direction is known as the rightExtent 54 and 56, respectively, and the actual distance characters 40 and 42 extend from their leftmost edges to the y-axis 48 is know as leftExtent 58 and 60, respectively. The type of characters 40 and 42 (i.e., the height of the characters, expressed as points, e.g., 12 point) measured from their lowermost portion to the x-axis 36 is known as descent 62 and 64, respectively. The heights of the characters 40 and 42 measured from the x-axis 36 to their topmost portions are known as ascent 66 and 68, respectively. From FIG. 7 it can be seen that lightened character 42 differs from character 40 in all the parameters named above, except, of course, escapement. These differences mean that although lightened characters have the same general shape as the original characters, without further modification a line of the lightened characters would appear different than a line of the original characters, since the lighten characters would lie along a different baseline. Moreover, the lightened characters may even appear to have different baselines than each other.

Figure 8:
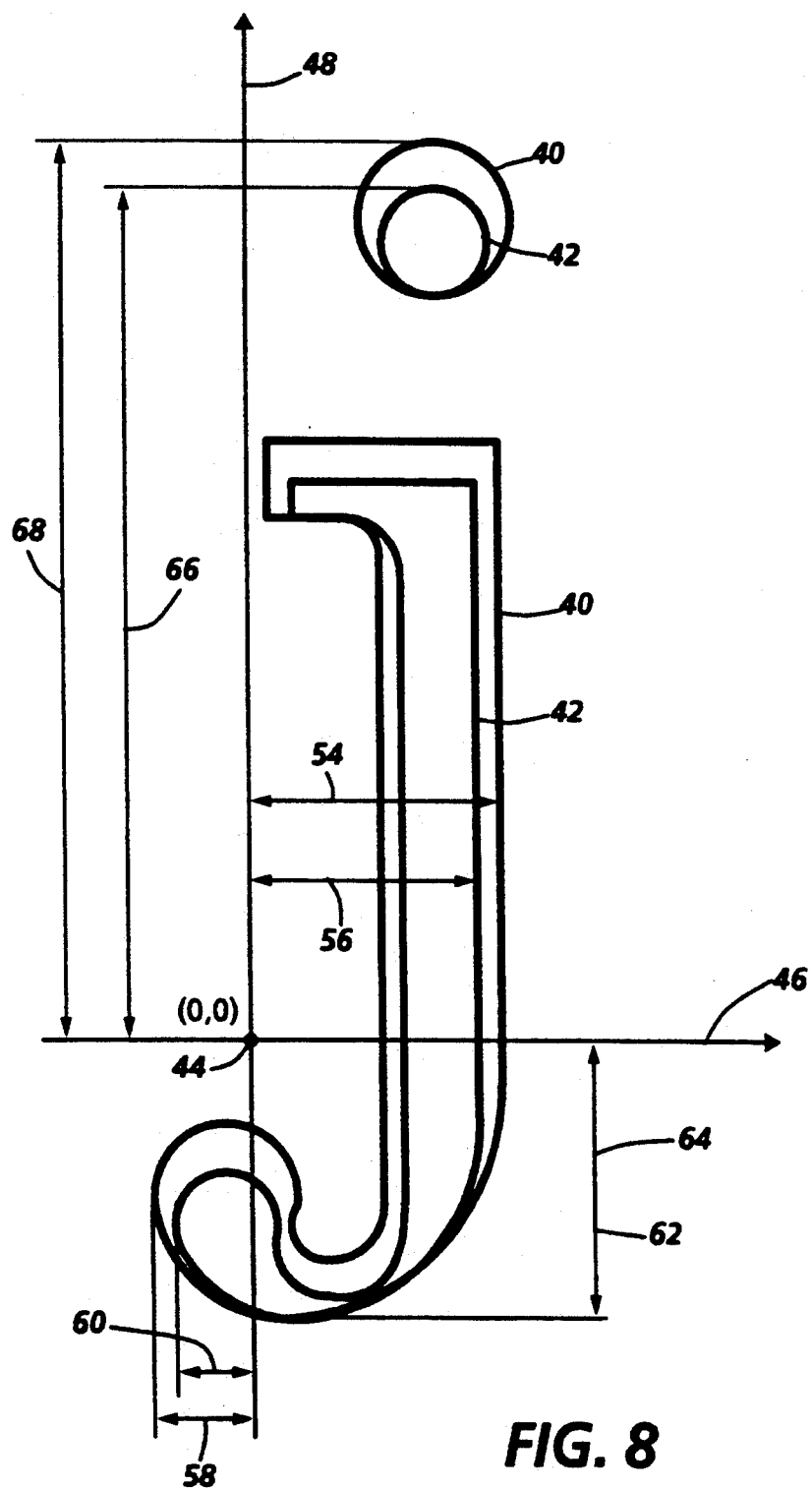

The second procedure of the method of the present invention deals with the differences caused by adjusting the weight of the characters. The first step of the second procedure is to align lightened character 42 with character 40 vertically. Referring now to FIG. 8, vertical alignment is achieved by first compensating character 42 for its change in descent (from descent 62 to descent 64), so that the bottom (i.e., lowermost portion) of character 42 aligns with the bottom of character 40. One approach to descent alignment is to compare the character metrics of characters 40 and 42, and calculate the difference between the descents 62 and 64. The descent difference could then be applied as an offset to translate the control points of the character masks of character 42. In particular, the control points of character 42 would be translated in the negative y direction by the amount of the difference, an operation that would not effect the x component of each control point. Preferably, however, the above approach is only calculated for the representative character, capital H, and this difference is applied to the other characters of the font.

Figure 9:
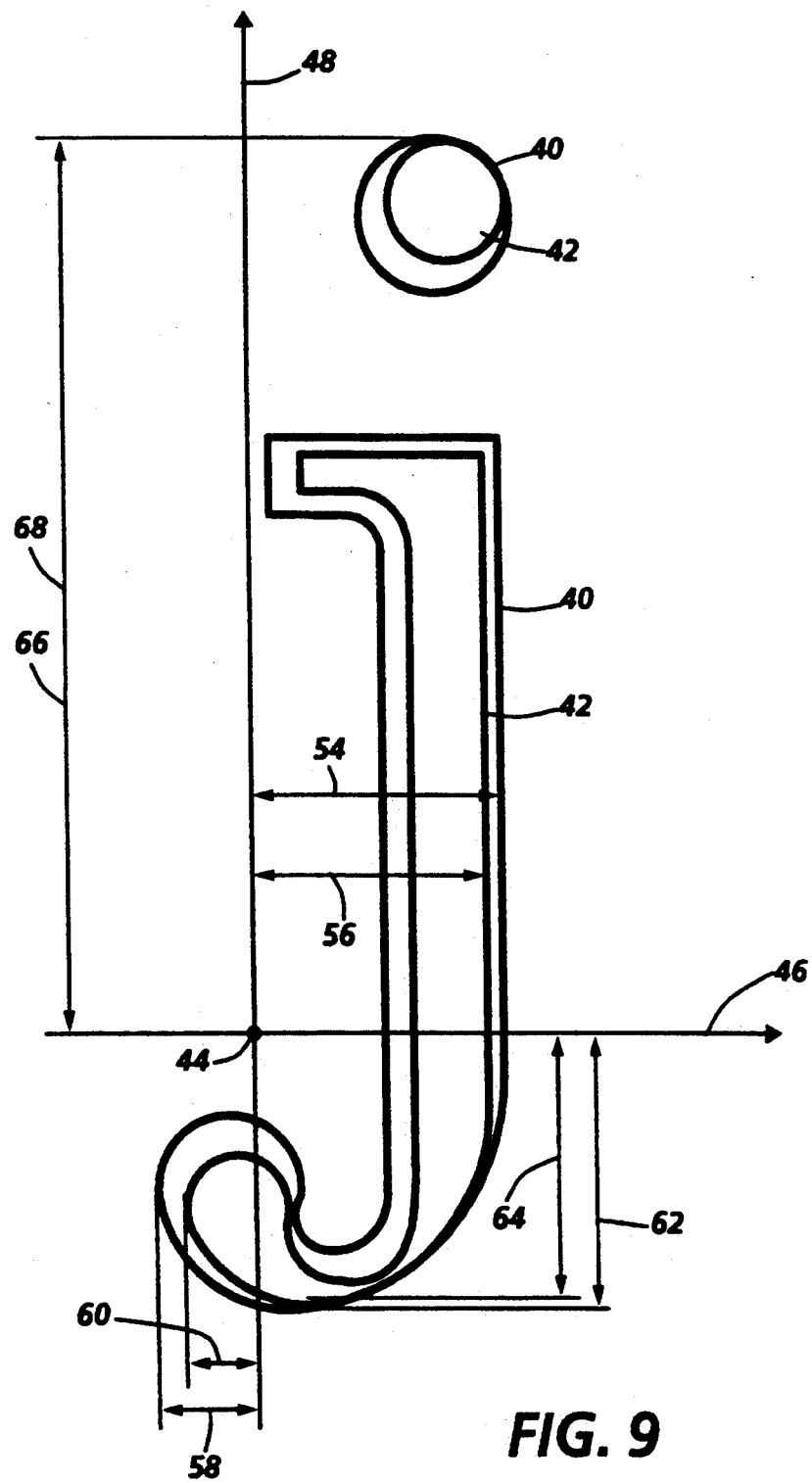

Next, referring to FIG. 9, the lightened character 42 is aligned with character 40 in ascent. To align the ascents 66 and 68, a first approach is to scale the control points of character 42 by a factor that will give character 42 an ascent 68 equal to the ascent 66 of character 40, changing the character metrics to reflect the changes. With the first approach, different characters in a font might require different scaling factors. A second approach is to first determine a single scaling factor for all the characters in a font by applying the first approach to the representative character, capital H, Next this scaling factor can be applied to the remaining characters in the font. FIG. 9 depicts the second approach. With both approaches to ascent alignment, the scaling factor is applied to the horizontal dimension (i.e., x-axis 46 component of the control points), as well as to the vertical dimension (i.e., y-axis 48 component of the control points) of the character 42, so that the shape of character 42 is maintained. In contrast, the shape of character 42 might be distorted were the scale factor to be applied only to the vertical dimension.

One side effect of ascent alignment through scaling is misalignment of the descending portion of the lightened character 42 with respect to the descending portion of the character 40. As can be seen in FIG. 9, the lowermost portion of character 42 now extends slightly below the lowermost portion of character 40. In general, characters having a value of descent greater than zero will exhibit similar misalignment, and characters that lie on the baseline (descent value of zero, and control points having a lowest y-axis 48 value of zero), which are most characters, will not be misaligned in descent.

Figure 10:
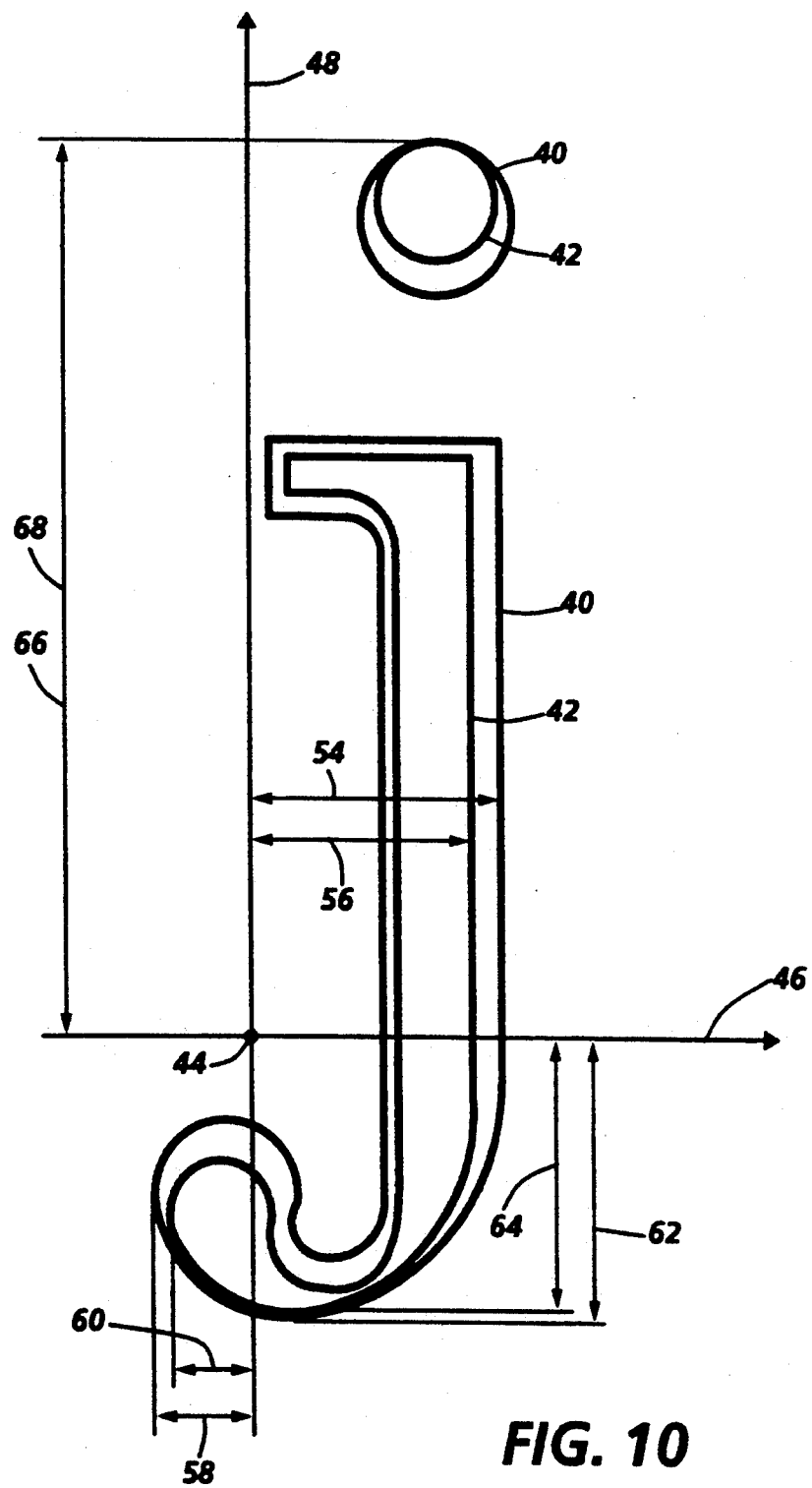

As can be seen in FIG. 9, applying the scaling factor in the horizontal dimension has the undesirable effect of shifting character 42 to the right (i.e., translating the control points along the positive x-axis 46), since most of the character 42, and hence the scaled control points, lie to the right of the y-axis 48. A simple method of tracking this horizontal scaling shift is to apply the scaling factor to the escapement of character 40, escapementX 50, to create a new escapement for character 42, escapementX 52. (Of course, this change is temporary; escapementX 52 will later be returned to the value of escapementX 50, thereby maintaining the escapement between original and lightened fonts.) To compensate for the right shift, as shown in FIG. 10, character 42 is shifted to the left, the direction opposite to the direction of the undesired shift, by translating its control points by an amount equal to half the difference between escapementXs 50 and 52. The necessary adjustments are then made to the character metrics of FIG. 42 (i.e., the adjustment is made to right and left extents 56 and 58 of character 42). The value of escapementX 52 of character 42 is then set to the value of escapementX 50 of character 40.

Were character 42 made bolder, instead of lightened, a similar second procedure would be employed, except that aligning characters 40 and 42 in descent would involve raising the control points of character 42 (instead of lowering the control points) the described distance, and aligning characters 40 and 42 in ascent would involve scaling character 42 to be smaller, rather than larger. Aligning characters 40 and 42 in width would still involve a horizontal translation of half the escapement change in the direction opposite to the direction of the undesired shift. (However, for a character made bolder rather than lighter, the compensating shift would be to the right, rather than to the left.)

Referring now to FIG. 1, although curve segment 12-2 was a Bezier curve segment, the method of the invention applies to other types of curve segments as well. In particular, the method applies equally well to conic curve segments, such as described on pages 219 to 223 of Interpress: The Source Book. Conic curve segments typically employ only 3 control points, two endpoints and a single middle point. Moreover, the method can be used with B-spline curves by first converting any segments represented by B-spline curves into four control point Bezier curve segments, as described on pages 226 to 227 of Interpress: The Source Book. Similarly, it would be well known to one skilled in the art to convert the B-spline curves into Bezier curves having more control points than four, and it would be well know to one skilled in the art to apply the invention to curves having a higher order than three.

While the invention has been described with reference to the structures disclosed, it is not confined to the specific details set forth, but is intended to cover such modifications or changes as may come within the scope of the claims.

What is claimed is:

1. A method for adjusting the weight of a character of an outline font to produce an adjusted character, the character and adjusted character being described by control points that guide the drawing of line or curve segments, with each line or curve segment being described by two end control points and each curve segment also being described by at least one middle control point, the method comprising the steps of:

a. determining for each line and curve segment of the character a first line, with the first line defined by the two end control points of the line or curve segment, and determining a second line, with the second line parallel to the first line and offset from the first line a predetermined distance in a predetermined direction;

b. finding for each line and curve segment of the character first intersects, the first intersects being intersects between the associated second line and the second lines of adjoining character segments, and setting the first intersects as the end control points of the associated segment of the adjusted character;

c. determining for each curve segment of the character a third line that is defined by one end control point of the character curve segment and the associated end control point of the associated adjusted character curve segment, and a fourth line that is defined by the other end control point of the character curve segment and the associated end control point of the associated adjusted character curve segment, and determining for each curve segment a second intersect, the second intersect being the intersect between the associated third and fourth lines; and d. determining for each middle control point of each curve segment of the character a fifth line, the fifth line defined by the middle control point and the second intersect, and a sixth line, the sixth line passing through the nearest end control point of the associated curve segment of the adjusted character and parallel to a line defined by the character middle control point and the adjoining character end control point, and determining for each middle control point an associated middle control point of the associated adjusted character that is the intersect between the associated fifth and sixth lines.

2. The method according to claim 1, wherein each curve segment is described by a Bezier curve.

3. The method according to claim 1, wherein each curve segment is described by a conic curve.

4. The method according to claim 1, wherein each curve segment is described by a quadratic B-spline, and the method includes the step of first converting each curve segment description from a quadratic B-spline to a Bezier curve.

* * * * *